US005358288A

United States Patent [19]

Lindner et al.

[11] Patent Number: 5,358,288

[45] Date of Patent: Oct. 25, 1994

[54] CAPILLARY DUCT SYSTEM AND PROCESS AND APPARATUS FOR PRODUCING A CAPILLARY DUCT SYSTEM

[75] Inventors: Hajo Lindner, Oberderdingen; Josef Zwickl, Bretten, both of Fed. Rep. of Germany

[73] Assignee: E.G.O. Elektro-Gerate Blanc u. Fischer, Fed. Rep. of Germany

[21] Appl. No.: 935,445

[22] Filed: Aug. 24, 1992

[30] Foreign Application Priority Data

Aug. 22, 1991 [DE] Fed. Rep. of Germany ....... 4127747

[51] Int. Cl.[5] .............................................. F16L 13/02

[52] U.S. Cl. ................................ 285/286; 285/334.5; 285/114; 228/182

[58] Field of Search ............... 285/114, 115, 286, 287, 285/334.5; 228/182

[56] References Cited

U.S. PATENT DOCUMENTS

| | | | |
|---|---|---|---|
| 1,245,912 | 11/1917 | Hedden . | |
| 2,005,087 | 6/1935 | Kamack | 285/334.5 |
| 2,183,043 | 12/1939 | Kerr | 285/286 |
| 2,313,308 | 3/1943 | Allen | 285/286 |
| 2,349,792 | 5/1944 | Rosenblad | 285/286 |
| 2,966,340 | 12/1960 | Chapman | 285/286 |
| 3,078,551 | 2/1963 | Patriarca et al. | 285/287 |
| 3,208,773 | 6/1963 | Boudrie . | |
| 3,534,986 | 10/1970 | Hartmann et al. | 285/287 |
| 3,746,374 | 7/1973 | Sedgwick et al. | 285/334.3 |
| 3,837,688 | 9/1974 | Vollbehr | 285/287 |
| 4,038,613 | 7/1977 | Fischer . | |
| 4,175,779 | 11/1979 | Apblett, Jr. . | |
| 4,288,109 | 9/1981 | Ellis . | |
| 4,333,669 | 6/1982 | Eckert . | |
| 4,810,011 | 3/1989 | Hashimoto . | |

FOREIGN PATENT DOCUMENTS

| | | | |
|---|---|---|---|
| 0191208 | 9/1956 | Austria . | |
| 0282974 | 3/1988 | European Pat. Off. . | |
| 0639227 | 12/1936 | Fed. Rep. of Germany . | |
| 2739759 | 3/1978 | Fed. Rep. of Germany . | |
| 3844472 | 7/1990 | Fed. Rep. of Germany . | |
| 2266215 | 10/1975 | France . | |
| 2454866 | 11/1980 | France . | |
| 2553688 | 4/1985 | France . | |
| 66438 | 11/1928 | Sweden | 285/334.5 |
| 0375439 | 5/1973 | U.S.S.R. . | |
| 308806 | 6/1930 | United Kingdom | 285/334.5 |
| 0394129 | 6/1933 | United Kingdom . | |
| 585945 | 2/1947 | United Kingdom | 285/287 |
| 718264 | 11/1954 | United Kingdom | 285/287 |

OTHER PUBLICATIONS

Cramer, Karl: Verbindung von Rohr und Rohrboden beim Bau von Apparaten, Behaltern und Kesseln. In: Maschinenmarkt, Wurzburg, 82, 1976, 79, S. 1449–1450.

*Primary Examiner*—Eric K. Nicholson
*Attorney, Agent, or Firm*—Quarles & Brady

[57] ABSTRACT

For producing a tube connection for a capillary tube, the connecting end is provided with an engaged connecting cap, then on the tube end is produced a funnel-shaped widening adapted to an extension and finally it is frontally fixed with a welded joint to the connecting cap. The thus formed mouthpiece can then be so connected with a connecting unit, e.g. a diaphragm capsule, a temperature sensor, etc., that the connection, completely covered to the outside, is located in the fluid space of the duct system. All the working steps can be carried out completely automatically, e.g. on a transfer line.

25 Claims, 3 Drawing Sheets

CAPILLARY DUCT SYSTEM AND PROCESS AND APPARATUS FOR PRODUCING A CAPILLARY DUCT SYSTEM

BACKGROUND OF THE INVENTION

The invention relates to a line system and to a process and/or an apparatus for producing such a system, which in particular has a capillary tube as the fluid-carrying line section and components or assemblies connected thereto, the connection generally being a hermetically tight connection point, which does not interrupt the line system in its vicinity.

Such systems can be used as hydraulic control members in manually adjustable regulating means for electrical or other thermal equipment, such as electric hotplates, baking oven heating systems, continuous heaters, etc. The expansion liquid enclosed in pressure-tight manner with respect to the outside fills the interconnected areas in a complete, gas-free manner. An area on one end of the capillary tube is widened compared with the internal cross-section of the latter and can be formed by a separate, tubular jacket of a temperature sensor, whereas a corresponding, but appropriately smaller volume area at the other end of the capillary tube is formed by a casing, which as a function of volume changes with respect to said area has a movable actuator for at least one contact, a mechanical control member or the like. Fluid expansions in the temperature sensor lead to fluid displacements from the temperature sensor via the capillary tube into the casing area, and conversely, fluid compressions in the temperature sensor via the capillary tube lead to the reduction of the fluid volume in the casing space. The capillary tube can have a length of at least a half a meter or more than two meters and can be connected by means of a branch to a further capillary tube section. As a result of its flexibility, resilient characteristics, metallic characteristics, small external diameter of roughly one or a few millimeters and its smooth surface nature, the capillary tube is very difficult to handle in the manufacture of the system and during its installation.

In addition, the production of joints and their permanent sealing can be problematic. If the joints are soldered in the vicinity of an outer face of a connecting piece receiving the capillary tube, then most of the adhering solder is freely accessible to the atmosphere, so that there is a risk of rapid damage by corrosion to the soldered joint, particularly at elevated operating temperatures. The material differences between the soldering material and the parts to be soldered contribute to this. It is also very difficult to check a soldered joint with respect to its quality or seal, strength, freedom from gaps and cracks, etc. Some parts, e.g. a tubular temperature sensor, could be shaped in one piece from the capillary tube, but then the manufacture of differently constructed combinations of capillary tubes and sensors is made more difficult because one component cannot be connected in random manner to different other components.

For the mass production of such hydraulic systems, it is particularly appropriate to solder the joined components continuously when passing through a soldering furnace or by high frequency heating, but all components to be previously interconnected in accordance with the assembly sequence must be completely exposed to a relatively high heating, which is not favorable for protective hoses, springs, etc., because their material characteristics will change under the action of heat. It has also been found that soldering leads to an embrittlement of the capillary tube material at the joints. Other joining methods, such as plasma or laser welding, bring out scarcely any changes if the joints in the vicinity of said outer end are located at the intake of the capillary tube in a hole, in whose vicinity the capillary tube is normally exposed to maximum bending or alternating loads. An anti-kink device, such as a sleeve, shoved over the joint following the manufacture of the fused joint scarcely obviates this problem, because it can only act against significant bending deflections and only at a distance from the most critical areas of the joint.

If the capillary tube is directly connected to the actuator, then as a result of operation, it performs countless micromovements with the travel of the actuator, which can lead to a fatigue failure of the capillary tube, particularly if it is embrittled in this area by the manufacture of the joint. This can be admittedly counteracted by a curved capillary tube section connected to said joints, but said curved section increases the depth of the associated switching appliance. In addition, the curvature of the capillary tube can only start following the soldering material which, as a result of the adhesion action during the molten state, creeps by e.g. 1 to 2 mm from said outer face and along the outer capillary tube circumference and after cooling forms a corresponding stiffening sleeve intimately connected to the capillary tube. Such soldering processes are also problematic from the ecological and industrial medical standpoints, because high energy expenditure is required and health damage can only be prevented by expensive ventilation of the working areas and rooms.

OBJECTS OF THE INVENTION

An object of the invention is to provide a system, a process and apparatus of the aforementioned type enabling the disadvantages of the known arrangements to be obviated, and which in particular, ensures a much greater fatigue strength of the joints.

SUMMARY OF THE INVENTION

According to the invention, means are provided through which the connecting point is located within the intake of the capillary tube into a connecting piece or member, such as a cap, in the vicinity of the front end of the capillary tube or has increased corrosion protection. The joint or the joining material shaped during the joining process is mostly, or even completely, located at a point sealed with respect to the outside, so that it cannot come into contact with atmospheric air. The joining material can be a separate, added material, but it is preferably shaped from the capillary tube or the connecting member, e.g. by melting under welding heat or by a crimping or squeezing process in which the two materials to be interconnected can also be welded together cold. Adhesively acting, plastic materials can also be used as the added material. These materials can harden following the production of the connection or joint. If the volume-largest part of the connecting material is spaced within the intake or outer face of the connecting member, which receives the associated capillary tube section in a mechanically radially rigid manner, and is not spaced within a shoved-on cover or is not surrounding said section with a radial spacing, then the connecting point is substantially hermetically sealed to the outside in the same way as the fluid filling of the system.

A very good securing of the capillary tube at least in an axial direction, particularly against pulling out from the connecting piece prior to the production of the final connection, can be achieved by an interlocking engagement of the capillary tube in a depression in the interior of the connecting piece. For example, a short section a limited distance immediately adjacent to the end face of the capillary tube, possibly including the end face, can be widened, so that the connecting piece is moved initially with respect to the capillary tube, although radially substantially clearance-free, but cannot be drawn over said end. Even after connection, the part of the tube casing contact-free relative to the connecting piece or most of the pipe casing section located in the connecting piece can be completely free from connecting material and therefore metallically bare from the tube material. For connection to the tube end, the connecting piece or cap can undergo a squeezing deformation.

The connecting member, which is preferably not constructed in one piece with the thin-walled, sheet metal vessel jacket of the associated connecting unit or shaped therefrom and which has thicker material cross-sections compared therewith, forms a connecting member for connection to an associated section of the vessel jacket of the connecting unit. The connecting member appropriately engages in a substantially radial clearance-free displaceable manner in an associated section of the vessel jacket or a further intermediate joining member, such as a collar, fixed to the vessel jacket with respect to which it is stop-limited in the insertion direction. After the insertion of the connecting piece, it can be fixed in sealed manner by producing a connection of the described or a similar type. With a connection of this type, optionally the further joining member can also be fixed to the vessel jacket.

The set object can also be achieved in that in the case of a sleeve-like connecting section of the pressure vessel, said tube end passes axially adjacent and in spaced manner to the joining point with a substantially constant width, so that e.g. a tubular pressure vessel emanating from the tube end can have constant cross-sections over at least part of its length and whose length is an integral multiple of the tube width or is more than a quarter or half the total length and which can extend up to a short end section closed by constriction and remote from the tube end. As a result, the tube end of the tube can have a much larger internal diameter than the external diameter of the non-expanded, central capillary tube and the annular space between said two circumferential surfaces is bridged by the sleeve-like connection, which over most of its length can have constant external cross-sections.

The set object can also be achieved in that for axial orientation by displacement relative to the connecting section of the connecting unit, a further connection has a dimensional reference surface, e.g. an axial stop projecting over its outer circumference, which makes it possible to precisely fix the axial position of the capillary tube relative to the receiving connecting part. This axial position is important for its adjustment in the case of a closed hydraulic system, because it influences the reception volume of the system. If, prior to reaching the stop position, the capillary tube is displaceably guided relative to the connecting part simple fitting is made possible. The dimensional reference surface can in simple manner be formed by a front or rear face of the part which, prior to fixing to the connecting unit, is directly connected to the capillary tube. This sleeve also forms an outwardly directed shield for the associated connecting point.

The set object can also be achieved in that a quadrantally curved section of the capillary tube, which is connected to the connecting unit, begins with the curvature within a component connected to the connecting part of the connecting unit and not in the axial outer spacing with respect thereto, so that at least part of said curved section can be located within a connection or a casing of the pressure vessel. This permits a significant reduction in the height of the associated connecting unit, particularly the device receiving the actuator in the direction of the connection axis of the capillary tube.

According to the invention, in a process for producing a capillary tube line system, it is also provided that firstly the connecting section, such as the tube end, of the capillary tube is directly fixed with a connection such as a weld, and then by producing at least one further connection, such as with a collar, the first-mentioned connection is brought into a protected position. After both connections are produced, they are appropriately completely positionally rigid relative to one another. Alternatively, the particular connection has in the longitudinal direction of the tube an extension which is at the most roughly the same as the wall thickness of the capillary tube or the vessel casing.

The inventive construction is particularly suitable for switching devices according to DE-OS 38 44 472 (U.S. Pat. No. 5,029,303), to which reference should be made for the inclusion of its features and effects into the present invention. After the two ends of the capillary tube, at a limited distance adjacent to one another, have been connected to a cap, a sensor tube is tightly welded from the circumference to said cap using a fixed laser beam. A membrane subassembly has an expansion capsule. A nipple is fixed to one of its front ends for the capillary tube or a pressure piece for the adjusting spindle fixed to the front end remote therefrom. The membrane subassembly is engaged by means of the nipple on the other connection of the capillary tube and said nipple is welded to the connection by a fixed laser beam. In place of the last-mentioned engagement, e.g. if the nipple is not preassembled with the sub-assembly, the subassembly can also be axially attached to the nipple or the connection and then fixed by welding from the front end of the associated expansion capsule end wall. However, in this case, the expansion capsule is appropriately not yet assembled and closed by the welding of the overengaging edges of its capsule parts and instead initially only one capsule part is fixed to the capillary tube, after which the capsule is closed with the other capsule part and sealed by the welding of the edges. All the welds can be optically very easily checked or inspected for their sealing action.

The inventive operating steps can be performed in an automatic production on a transfer line, if the longest capillary tube section located between the capillary tube ends is secured in a storage device during production and therefore with respect to the ends cannot perform uncontrolled movements or can only perform insignificant relative movements.

An apparatus for producing a capillary tube system has, according to the invention, means for the positionally secured reception of substantially the entire capillary tube and preferably clamping devices are so provided for the apparatus-fixed securing of the capillary tube ends that the ends project by a length adequate for all work. As the capillary tube is made from resilient, elastic material, the freely projecting ends can be simply resiliently deflected with respect to the apparatus and consequently precisely oriented or aligned with respect to the associated tool units in the particular work station of the transfer line.

BRIEF FIGURE DESCRIPTION

These and further features can be gathered from the claims, description and drawings and the individual features, both alone and in the form of sub-combinations, can be realized in an embodiment of the invention and in other fields and can represent advantageous, independently protectable constructions for which protection is hereby claimed. Embodiments of the invention are described in greater detail hereinafter relative to the drawings, wherein:

DETAILED DESCRIPTION OF PREFERRED EXAMPLE EMBODIMENTS

Figure 1:
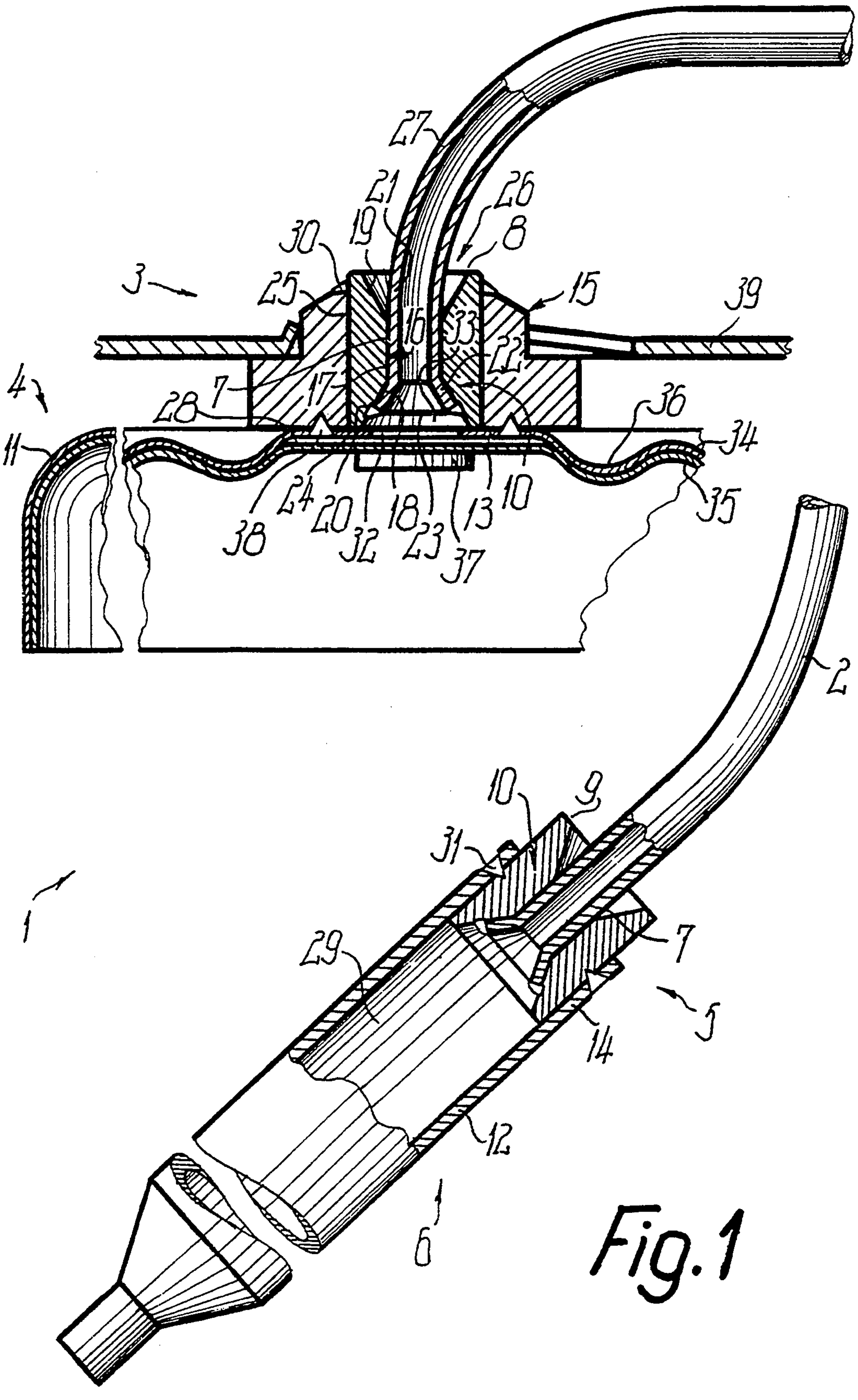
FIG. 1 shows, partly in section, the line system according to the invention.

In the represented embodiment, apart from a one-piece capillary tube 2 passing between the ends of the system 1, the system 1 has, at said ends, connecting units 4, 6, connected by means of tube connections 3, 5, in the form of a membrane capsule and a tubular temperature sensor. Each end of the capillary tube 2 forms a connecting section end 7 connected to the particular end face which is much longer than its external diameter of 1 mm. The end 7 extends to the point where, with its outer circumference it is in a direct contact with the particular tube connections 3, 5, uninterrupted over the circumference or its length. The end portion of the capillary tube 2 is jacketed over said connecting end 7 over and beyond its length, but with at least a small radial spacing, which can be of the same order of magnitude as the connection end 7 or smaller. This section extends up to a connecting face 8 or 9, where the capillary tube 2 passes from the outside into the jacket. Said contact-free and contacting jacketing of the connecting end 7 is formed by a sleeve or collar-like connecting cap 10, whose cylindrical outer circumference has a constant diameter, which is roughly the same as the axial extension of the connecting cap 10. The connecting cap 10 is constructed symmetrically to the center of its length, and can be used in randomly turnable manner, and also, all the connecting caps 10 of the system 1 have an identical construction, so that any random one of the connecting units 4, 6 to be connected can be joined to both ends of the capillary tube 2.

Each of the two connecting units 4, 6 appropriately forms a pressure vessel with a one-part or multipart vessel casing 11 or 12. The vessel casing 11 of the connecting unit 4 can form an approximately disk-shaped, planar connecting wall 13 for the tube end 7, while the vessel casing 12 of the connecting unit 6 forms a tubular or sleeve-like connecting wall 14, which can be formed by a continuous extension of the casing 12, not subject to any preprocessing. In the case of the connecting unit 4, the connecting cap 10 is not directly fixed to the vessel casing 11. Instead, this takes place by means of a collar or flange-like intermediate joining member 15, although, as in the case of the connecting unit 6, the connection cap 10 could be directly fixed to the connection wall 14.

Both tube ends 7 of the capillary tube 2 are also fixed in the same way to the associated connecting cap 10, so that after equipping the capillary tube 2 with the two connecting cap 10, they can be used as desired for either connecting units 4, 6. The connecting cap 10 has a passage opening 16 along its central axis, which is constructed in spaced manner between the plane-parallel end faces of the connecting cap 10 as a cylindrical reamed hole 17, which is closely adapted to the external cross-section of the tube jacket of the capillary tube 2 and can therefore form for the tube end 7 a substantially radial clearance-free or tight sliding guide. At one or both ends, the reamed hole 17 passes directly into the narrowest end of an acute-angled, conical extension 18, 19, which can in each case be slightly shorter than the reamed hole 17.

The tube end 7 provides a widening 22 connected to its end face or only having a distance therefrom smaller than its width, and which in the represented embodiment, has an acute-angled, frustum-shaped construction with the same cone angle as the associated extension 18, but is much shorter than its length and its width. The length of the widening 22 can be approximately half the external diameter of the capillary tube 2. Appropriately, after engaging the connecting cap 10 on the expanded tube end 7, the widening 22 is produced on a mandrel with plastic deformation, the extension 18, and optionally, the reamed hole 17 forming the matrix or this widening process, so that the tube jacket is applied narrowly, in whole-surface manner and with considerable pressure radially against the extension 18 or the reamed hole 17. This leads to a high sealing action, e.g. by cold welding of the pressed together surfaces, accompanied by structural compression of the material of the tube end 7 and the connecting cap 10.

This connection can be located directly at the end face 23 of the tube end 7 or at a limited axial spacing therefrom and be connected substantially in annular manner to the face 23 of the widening 22 and to the jacket thereof spaced between the ends of the extension 18 and can have an axial extension which is approximately the same as the thickness of the tube jacket 21, which is approximately $\frac{1}{4}$ mm, so that the axial and radial extension of a connection 20 is approximately of the same order of magnitude.

This joint connection 20, which is also produced from the front end 23, is formed by a weld or other solidifiable material and need not project inwards over the inner circumference of the widening 22 and inwardly has an axial spacing roughly the same as the thickness of the tube jacket 21 from the passage surface 24, which is formed by the end of the connecting cap 10 remote from the outer face 8, so that the passage surface 24 is suitable as a dimensional reference or engaging surface for the butting engagement on the outside of the connecting wall 13 even if there is no direct connection here, such as a welded joint. If the connecting section is spaced between the ends of the tube jacket 21, then it can be formed by one or more openings in the tube jacket 21, which then in each case form a section of said end face 23, which is also suitable for producing a weld, so that in this case, the capillary tube 2 can project past both ends of the connecting cap 10.

As a result of the extension 18 or 19, the outer face 8 and the passage surface 24 are bounded in narrow annular manner with a ring width of approximately the thickness of the tube jacket 21 and on the outer circumference by the cylindrical outer surface 25 of the connecting cap 10. The extension 19 forms a kink protection 26 for the tube end 7 of the capillary tube 2 exposed on the reamed hole 17, because the extension 19 can serve as a stop for the outer circumference of the capillary tube 2. In addition, the extension 19 forms a reception space for a quadrantal curved portion 27 of the capillary tube 2, whose curvature commences directly at the end of the reamed hole 17 connected to the extension 19 and therefore relatively close to the connecting wall 13, so that in the axial direction of the connecting unit 4, a reduced height is obtained.

Each connecting unit 4 or 6 bounds a fluid space 28 or 29, to which the connecting cap 10 is connected in frontal flush manner, instead of directly, and optionally, communicates with a further intermediate joining member, such as a collar 15. The fluid space 28 of the connecting unit 4 is substantially a very flat, disk-shaped space axially parallel or equiaxial to the associated tube end 7, while the much larger fluid space 29 of connection unit 6 can be an elongated, approximately cylindrical space. In the case of the connecting unit 4, the connecting cap 10 is inserted substantially completely flush in a bore of the intermediate collar 15, so that the passage surface 24 is located approximately in the plane of the associated face of collar 15. The cap 10 in the vicinity of its other end located at the outer face 8 is connected by means of a single connection such as a weld 30 in positionally rigid, sealed manner to the collar 15.

This connection 30 can also be formed by an annular weld having roughly the same cross-section, which is appropriately connected to the outer surface 25 and to the associated face of the collar 15 and optionally approximately to the outer face 8. Prior to the application of the connection 30, the connecting cap 10 can be moved in substantially radial clearance-free manner in the bore of the collar 15. As a function of the requirements before and after the production of the connection weld 30, the intermediate collar 15 is fixed with another connection 38 to the connecting wall 13, said connection 38 having a seam, as described in connection with the other connections and is located with a radial spacing outside the outer surface 25 or the bore of the intermediate collar 15. The face of the intermediate collar 15 is appropriately engaged in planar manner on the outside of the connecting wall 13.

If, prior to connecting to the connecting cap 10, the intermediate collar 15 is fixed to the connecting unit 4, then the connecting cap 10 can be inserted in the collar's bore until its face axially abuts directly on the outside of the connecting wall 13. In this case, the vessel casing 11 of the connecting unit 4 can be completely closed prior to the connection to the capillary tube 2; production being such that two cap-like vessel parts 34, 35 are interengaged and connected such as by welding at their overengaging casing edges in such a way that they bound the fluid space 28 between their annularly, wavy caps.

However, if the connecting cap 10, the intermediate collar 15 or the associated tube end 7, after the fixing of the connecting cap 10 to the intermediate collar 15, are fixed to the connecting wall 13 with said connection 38, then the inner vessel part 35 is still not installed or fitted, so that the inside of the connecting wall 13 remains free for producing the connection welds 20 or 38 and only then is the fluid space 28 closed. The connecting wall 13 appropriately has a an opening 32 roughly coaxial to the tube end 7 and by means of which the tube end 7 communicates with the fluid space 28 and whose outermost boundary can be roughly of the same width as the maximum width of the tube end 7. As a result of the described construction, a flat disk-like hollow cavity 33 within the connecting cap 10 is bounded between the connecting wall 13 and the end face 23 and within which the connection weld 20 covered by the fluid is completely sealed with respect to the air, because said cavity 33 is hermetically sealed to the outside by the connection weld 38.

However, in the case of the connecting unit 6 in place of a frontal connection weld, an annular circumferential connection such as a weld 31 is provided directly between the outer surface 25 of the connecting cap 10 and the jacket of the connecting wall 14 immediately alongside its end face, so that the connecting cap 10 projects freely past said end face. Here again, the inner circumference of the connecting wall 14 forms a substantially radial clearance-free sliding fit, which is substantially tight in the manner of a piston displaceable in a cylinder and this serves for the connecting cap 10, which in this case, is inserted in stop-free manner in the connecting unit 5, so that by more or less deep insertion with the connecting cap 10, the total volume of the system provided for receiving the fluid can be precisely adjusted. The wall thickness of the connecting cap 10 is much larger than that of the connecting wall 14, so that the connection weld 31 can be produced from the outside without any damage risk.

Following the closing of the system 1, e.g. by producing the last connection or closing a filling opening, liquid expansions in the fluid space 29 lead to an enlargement of the volume of the fluid space 28. One of end walls, such as the connecting wall 13, forms a membrane 36, which performs an axial travel due to the volume changes. For supporting the other end wall with respect to an appliance socket, on its outer face, there is fixed a support body 37 roughly equiaxial to the associated tube end 7, whose face is supported on an adjusting spindle. The connecting collar 15 simultaneously serves as a nipple by means of which to the membrane 36 is fixed a control arm 39, such as a leg of a bent flat spring arm in such a way that the lifting movements are transferred to the free end of said arm 39, which can act by means of an insulator on a movable switching contact. The arm 39 can be engaged on an external diameter-reduced section of the intermediate collar 15. For example, the control arm 39 is positionally secured in an axial area by claw engagement with respect to the outer circumference of the connecting collar 15 and this approximately coincides with the reamed hole 17.

For the axial adjustment of the tube end 7 relative to the associated connecting units 4 or 6, the particular connecting cap 10 appropriately has at least one dimensional reference surface, which in the case of the connection to the connecting unit 4 can be formed by the passage surface 24, and in the case of the connection to the connecting unit 6, by the connecting face 9. By means of the position of said reference surface relative to the remaining connecting unit 4, 6, the adjustment can be carried out. The curved portion 27 appropriately passes directly tangentially into a ring portion bent out of the capillary tube 2 and which is approximately at right angles to the axis of the associated tube end 7 and serves as a resilient compensating section.

Furthermore, on at least part of the length, it is possible to provide on the capillary tube 2, in relatively closely embracing manner, a hose, made from a heat-resistant fabric or the like, made from silicone, glass fibers, etc., which is connected approximately to the connecting cap 10 of the connecting unit 4, but is not connected in interlocking or adhering manner to either the connecting cap 10 or the associated portion of the capillary tube 2, but is fixed only by the curvatures of said capillary tube portion.

Solidifiable connections, which are directly adhering or produced by melting processes, e.g. soldering, in the vicinity of the tube ends 7, are at the most provided up to the transition between the reamed hole 17 and the extension 19, but preferably only in the vicinity of the extension 18, so that the material of the tube end 7 is only stressed in a very restricted axial area by the thermal loading occurring on producing the weld and no parts of the weld material can be provided where the tube jacket 21 is exposed on either side of the connecting face 8 or 9 with respect to the connecting cap 10. In place of laser welding for producing the weld, it is also possible to use plasma welding.

In a particularly advantageous construction, independently of the remaining inventive features, the connecting cap 10 or the intermediate collar 15 of the tube connection 3 can also be connected by a riveted or fused connection, such as a welded connection, to the control arm 39 in such a way that a destruction-free detachment is no longer possible. The connecting cap 10 or intermediate collar 15 can be shaped directly to the rivet head or engage in a bore of the control arm 39 adapted to its outer circumference in such a way that along the circumference the materials of the two components to be interconnected are coalesced in annular manner. As a function of the thermal load to be expected, a soldered joint is also conceivable.

Figure 2:
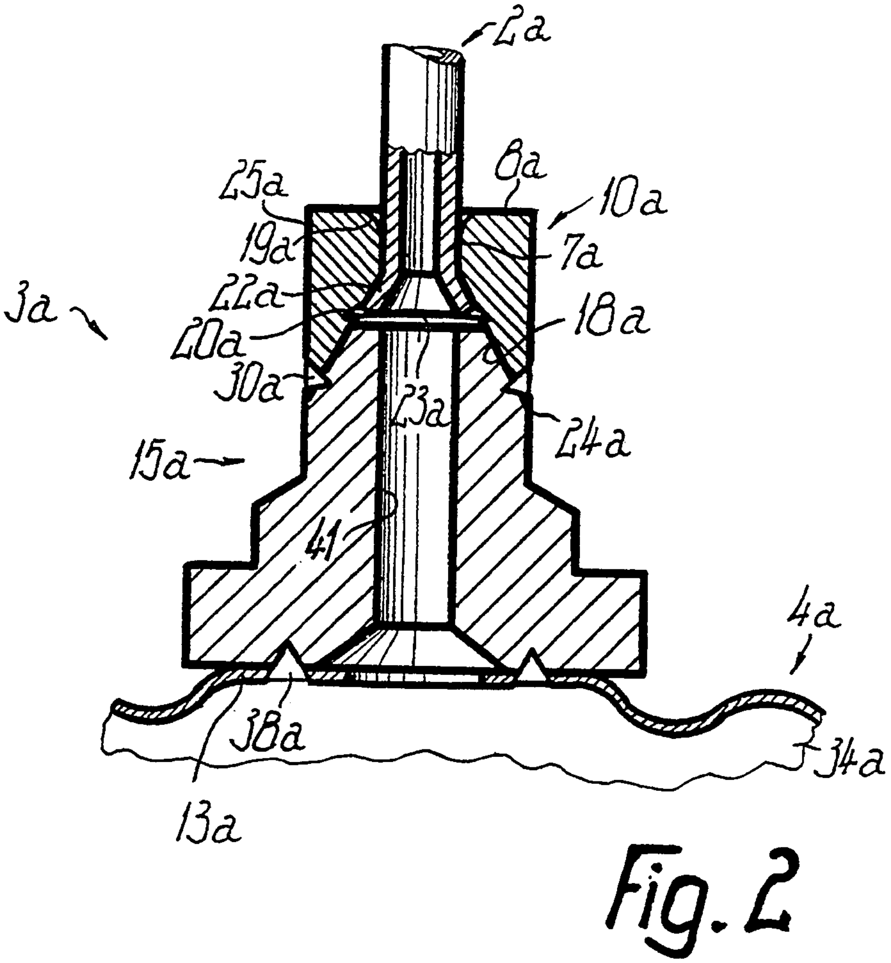
FIG. 2 shows another embodiment in axial section.

In the embodiment according to FIG. 2, the connecting cap 10a engages in caplike manner over the outer circumference of the component to be connected thereto, e.g. the intermediate joining member 15a. Preferably, the large-surface engaging jacket faces of the two components are acute-angled frustum-shaped. For this purpose, in simple manner, the extension 18a of the connecting cap 10a can be axially extended with a constant cone angle to such an extent that it forms in the gap spacing from the end 23a or the connection 20a a frustum-shaped receptacle for the engagement of a frustum-shaped portion on the outer end of the intermediate joining member 15a. This receptacle can, in axial section, pass in sharp-edged, acute-angled manner into the outer face 25a, which at least at the resulting terminal edge 24a, appropriately has the same external diameter as the wider end of the frustum-shaped outer face of the intermediate joining member 15a. Thus, after joining, there is a substantially step and gap-free, through outer face in the vicinity of the joining point and the connection 30a can be provided as a circumferential groove very close to the terminal edge 24a, in the vicinity of which the material thickness of the connecting cap 10a is much smaller than that of the intermediate joining member 15a.

In this construction the widening 22a of the capillary tube 2a is axially adjacent to the associated front end of the joining member collar 15a, whose through bore 41 emanating from said end is provided for the fluid connection to the connecting unit 4a. After producing the connection 30a the connecting cap 10a forms an extension of the outer face of the intermediate joining member 15a, so that the control arm can be fixed to the outer circumference of the connecting cap 10a or to the intermediate joining member 15a and the overall body formed from these two parts can be significantly shortened compared with the representation of FIG. 2.

Both with regards to the axial extension and with regards to their width and profiling, the extensions 18a, 19a of the connecting cap 10a have different constructions. The extension 19a is in this case formed by an approximately quadrantally rounded ring zone, which is shorter or on average less wide than the extension 18a or the widening 22a. Otherwise, in FIGS. 2 and 3, corresponding parts have the same reference numerals as in FIG. 1, but are followed by a or b, so that all the description parts appropriately correspond to all the embodiments.

Figure 3:
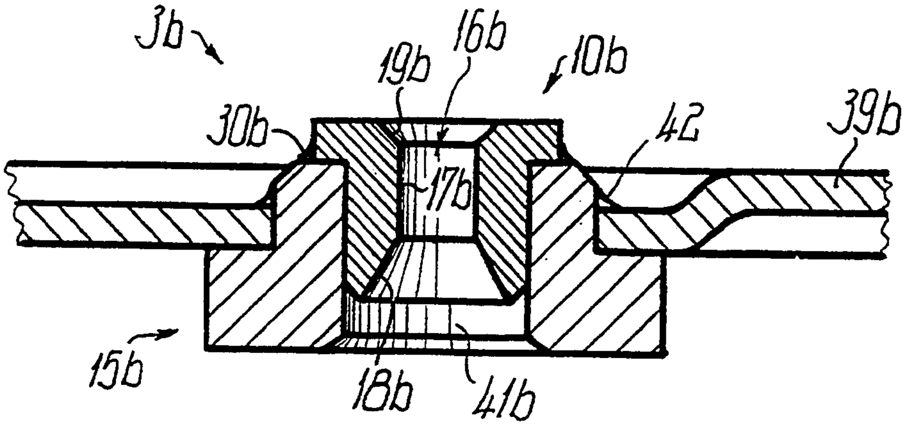
FIG. 3 shows a tube connection without a tube.

According to FIG. 3, the connecting cap 10b is constructed as a collar, which closely engages in a corresponding reception hole 41b of the intermediate joining member 15b and engages over the engagement portion on the outer face of the intermediate joining member 15b. Thus, the axial position of the connecting cap 10b is precisely fixed relative to the intermediate joining member 15b, and the connection cap 10b is set back relative to the inner fixing face of the intermediate joining member 15b, so that the connecting cap 10b does not strike against the connecting wall of the associated connecting unit 4 and instead, like the connecting tube end of the not shown capillary tube, is positioned in spaced manner outside the connecting wall of said connecting unit.

FIG. 3 shows a welded joint 42 for the positionally rigid connection of the control arm 39b to the joining member 15b, which is located axially between the solidifiable connection, such as a weld 30b and the not shown connection 38. The weld connection 30b is located between the outer circumference of the flange of the connecting cap 10b and the outer face of the intermediate joining member 15b. As a function of the assembly sequence, the weld connections 30b, 42 can also be formed by a single weld or seam. All the represented constructions can also be provided in a single embodiment, e.g. if a connecting unit has more than one connecting or intermediate piece and they are fixed to the connections in accordance with the embodiments.

Figure 4:
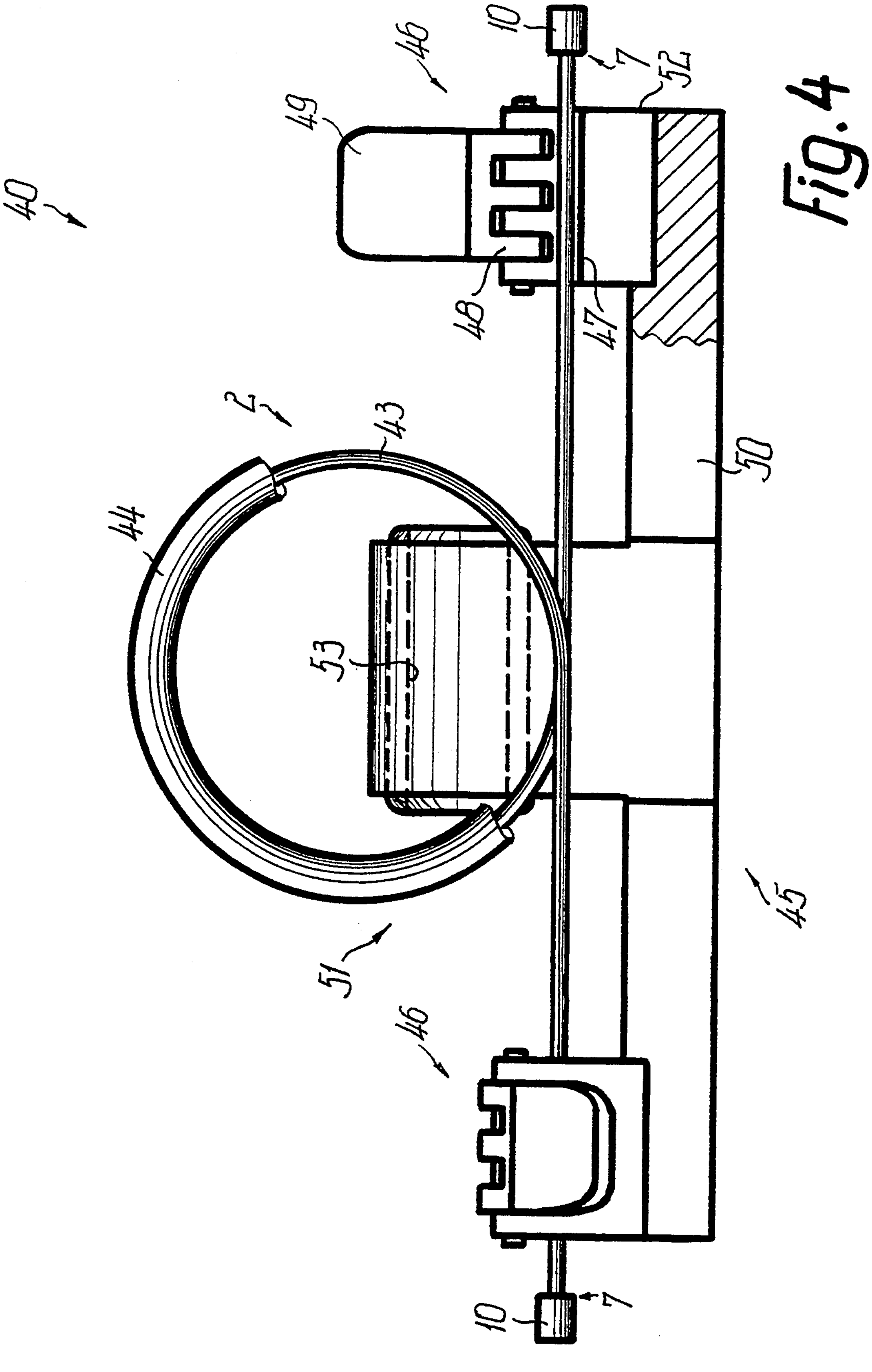
FIG. 4 shows an apparatus for producing the line system.

FIG. 4 shows an apparatus 40, in simplified manner, enabling the capillary tube to be connected substantially to all components to be fitted or connected thereto. Prior to the insertion of the capillary tube 2 in the apparatus 40, in its portion between its connecting ends 7, it is wound into a helical section 43, such as is subsequently required for the transportation and fitting of the system, so that said section 43 can remain substantially unchanged after the production of the connections and up to the fitting in an appliance. The winding takes place in such a way that the two tube ends 7 project in opposite directions in substantially equiaxial manner and pass tangentially into the coil section 43. Prior to placing on the capillary tube 2, it is possible to engage a hose 44 or the like, which is then located in the vicinity of the section 43 or at least a linear portion of the capillary tube 2.

The apparatus 40 has a work carrier 45 with two clamping fixtures 46, which, with the fixed capillary tube 2, form a closed transportation unit in the manner of a workpiece slide. The two clamping fixtures 46 located at remote ends of the work carrier 45, and whereof in FIG. 4 the right-hand one is open, but the left-hand one is closed, are used for fixing one end of the capillary tube 2 in such a way that the tube ends 7 project freely and approximately equiaxially over the remote end faces of the work carrier 45 or the apparatus 40 by more than the length of the connecting cap 10 and consequently form freely projecting spring arms, which for the orientation of the particular work station can be moved slightly with respect to the work carrier 45.

Both the clamping fixtures 46 can be opened independently of one another, are identically constructed, and in each case, have a prismatic clamping receptacle 47 for the associated end portion of the capillary tube 2. Against said receptacle 47, the end portion can be clamped with a clamping member 48, which is mounted pivotably about an axis roughly parallel to the end portion with an actuator 49. The actuator 49 constructed in the manner of a freely projecting arm can be actuated both manually and also by a corresponding working member of a clamping station in a mechanical or motor-driven manner, the actuator 49 in said station being brought into the movement area of said working member and after fixing or release can be moved out of the movement path again, without an interlocking coupling or the like being required between said two members, apart from a stop-like driving connection.

The work carrier 45 has a plate-like base body 50, to show plate surface are fixed the two clamping fixtures 46 and whose top forms the bottom boundary of a reception zone 51, in which is located the section 43 substantially open and freely accessible from all sides between the clamping fixtures 46, so that its central axis is oriented approximately at right angles to the tube ends 7. The section 43 is held exclusively by means of the fixed end portions of the capillary tube 2, so that it does not have to be individually fixed or abut. The end face of the work carrier 45 traversed by the particular end tube ends 7 forms a reference surface 52, with respect to which the associated end of the capillary tube 2 can be axially oriented to a specific reference dimension, so that there is a precisely defined position of said end for the successive connections to be produced in the work stations.

At right angles to the connecting lines between the two clamping fixtures 46 on either side of the reception zone 51 there are two facing guides 53 which, in the same way as the clamping fixtures 46, only project over the top of the base body 50 and are e.g. formed by bushes for the engagement of guide bolts and which are parallel to the connecting tube ends 7. These guide bolts can be provided for the displacement of the apparatus 40 parallel to the connecting tube ends 7 and/or in the manner of link components of a chain conveyor can serve to convey successively interconnected apparatus 40 transversely to the connecting tube ends 7 and particularly roughly parallel to the plate plane of the base body 50 or to the central axis of the section 43 between individual work stations.

Using the apparatus 40, working can take place by the following process. After the capillary tube 2 gathered by the formation of the section 43 has been fixed in the described manner, the connecting caps 10 are engaged on the two projecting connection ends 7 and then the widenings 22 are formed and then the connections 20 produced. Prior to the production of the section 43, the hose 44 has been fitted and wound together with the section 43. The production of both widenings 22 or connections 20 can therefore take place simultaneously in the same way as the engagement of the connecting caps 10, although these operations are in each case performable successively with the same tool, in that the apparatus 40 is turned about an axis at right angles to its plate plane successively with both connecting ends 7 into the working area of said tool.

After all or both connecting caps 10 have been fixed, the associated connecting unit 6 or 4 is axially engaged on the connecting cap 10. The connecting unit 6 can be firstly fitted and then the connection 31 produced and then the connecting unit 4 with the associated connecting cap 10 can be brought into the fitting position and fixed by welding. If the intermediate joining member 15 is already preassembled with the connecting unit 4, then their vessel parts 34, 35 can also be interconnected and the joining takes place by the fitting of the intermediate joining member 15, which may already be prefitted to the control arm 39, on the associated connecting cap 10. However, if the connecting cap 10 is prefitted or constructed in one piece with the intermediate joining member 15, then they are brought together by planar engagement with the vessel part 34 and after which the weld connection 38 is produced, followed by the fitting and fixing of the vessel part 35. However, it is also conceivable to connect both the connecting units 4, 6 in one of the described ways simultaneously to both connecting ends or connection caps.

According to the invention, a connecting cap 10 can also be constructed in one piece with a connection such as a weld 50, so that there is no need for the connections 30, 30*a*, 30*b*. It is then possible in simple manner to initially only fix one component on the thus formed, one piece member in a first work station. Then the preassembled subassembly is conveyed to a further work station, where the component 35 is fixed to the component 34, e.g. by welding. Such a solution is conceivable in all the described embodiments. In the case of FIG. 2, for example, the widening tool for producing the widening 22*a* is inserted through the through bore 41 from the opposite face.

After producing the tube connections 3, 5, the exposed connections can be checked optically for their sealing using appropriate processes. In all the working operations, the considerable effective length of the capillary tube 2 is not prejudicial, because it is brought into a confined space by the coiled section 43. The capillary tube 2 can be produced by cutting from a much longer material strand and one or both end faces are appropriately at right angles to the tube axis, because the inventive construction avoids the connecting section being accidentally applied by its end face to the facing boundary wall of the associated fluid space 48 and in this way closed. If the connecting end 7 is provided with the widening 22, then there is no need to deburr the capillary tube end, because such a burr cannot significantly close or inadmissibly constrict the channel at the tube end. The outer face 25 of the connecting cap 10 can also be conically tapered at one or both ends, in order to facilitate insertion in the reception bore of the associated connecting unit 4 or 6 by self-centering. Correspondingly, there can be a funnel-shaped widening of the reception bore or opening. As a result of its simple construction, e.g. free form undercuts, the connecting cap 10 can be produced on a ramming machine in one operation, e.g. from a sleeve-like blank, which is in turn formed by a tube section. The materials of the connecting cap, intermediate joining member, capillary tube, connecting wall and the connections appropriately have substantially the same voltage potential with regards to the contact potential series of metallic materials, so that corrosion risks are avoided at the connection points even at elevated temperatures and when in use for a long time. Each of the described parts and arrangements can be provided in only a single occurrence or in multiple occurrence, e.g. for tube branches of a capillary tube.

We claim:

1. A capillary duct system comprising:

a tube having a capillary tube section having a tube end providing an end face, said end face being expanded in cross section relative to a substantially uniform cross section of said capillary tube section;

a connecting unit; and a connecting member having an interior and interconnecting said capillary tube section with said connecting unit in substantially pressure proof manner by means of a sealed connection, said connecting member having a reception opening that receives said capillary tube section, said sealed connection being provided by connecting material solidified from a non-solid state to produce said sealed connection, wherein said sealed connection is provided on said expanded end face and interconnects said expanded end face and said interior of said connecting member.

2. The duct system according to claim 1, wherein said connecting member has an exposed connecting outer face, said reception being formed in the vicinity of said exposed connecting outer face.

3. The duct system according to claim 1, further comprising means for protecting said sealed connection from corrosion.

4. The duct system according to claim 1, wherein said sealed connection is provided in said interior, spaced from a connecting face of said connecting member for engaging said connecting unit, in a location not exposed to the atmosphere surrounding the sealed connection, such that said sealed connection may be exposed only to a control fluid capable of filling said duct system, including said expanded portion of said capillary tube.

5. The duct system according to claim 1, wherein said connecting unit has a container jacket, said enlarged end face being separated from said container jacket.

6. The duct system according to claim 5, wherein said connecting member and said enlarged tube end form a preassembled component separate from said container jacket, each of said connecting member and said container jacket having wall cross-sections said connecting member having a thicker wall cross-section than said container jacket, said capillary tube section having a connecting jacket, said reception being closely adapted to said capillary tube connecting jacket, said connecting member providing an outer face freely exposed to an environmental atmosphere.

7. The duct system according to claim 5, wherein said connecting member has at least one passage opening which is sealed by a second sealed connection, said passage opening having at least one widened passage portion.

8. The duct system according to claim 7, wherein the capillary tube section has at least one widened portion having an outer circumference, said outer circumference of said widened portion engaging said widened passage portion, said widened passage portion forming an extended inner resting surface for an outer circumference of said capillary tube.

9. The duct system according to claim 1, wherein said sealed connection sealingly engages a length of said capillary tube section, said capillary tube section having an internal circumference and an external circumference, at least one of said circumferences being substantially shaped as a truncated cone.

10. The duct system according to claim 1, wherein said sealed connection engages at least one substantially conically truncated length section of an inner resting face of said connecting member, said length section having an axial extension covered over less than its entire length by said sealed connection.

11. The duct system according to claim 1, wherein said capillary tube section has a connecting jacket and said connecting member has a connecting face; in an area inside said connecting face, said connecting jacket being radially free of contact and opposing a kink and buckling protecting abutting face providing a widened funnel, said funnel extending up to said connecting face, said sealed connection being associated with a widened passage portion of substantially identical shape as said funnel on an opposite side of said member, said funnel and said passage portion being substantially acute-angled.

12. The duct system according to claim 1, wherein said connecting member has an exterior surface, an overall length extension and a center of said length extension, said exterior surface having a substantially constant cross-sectional profile over said entire total length extension and symmetry with respect to said center.

13. The duct system according to claim 1, wherein said capillary tube section is mounted into at least two connecting members, said connecting members being substantially identical, at least one of said connecting members being insertable into a receiver of said connecting unit in a closely engaging manner.

14. The duct system according to claim 13, wherein said connecting member that is insertable into said receiver inserts in a substantially fluid sealed sliding fit positionally secured with a second solidified connection, said connecting member having an external circumference, said second solidified connection being a weld seam located on said external circumference, said connecting unit having a tube body of internal cross-section wider than an external cross-section of said capillary tube section, said receiver being a tube section of said tube body and having a width extension, said width extension being substantially the same as a width extension of the tube body axially adjacent to said receiver.

15. The duct system according to claim 1, wherein said connecting unit has a diaphragm capsule and a connecting wall, said connecting member being fixed to said tube end and directly engaging said connecting wall substantially up to an external circumference of said enlarged tube end.

16. The duct system according to claim 1, wherein said sealed connection provides a substantially flat, annularly restricted welded joint provided by melting said capillary tube section at said expanded end face.

17. The duct system according to claim 16, wherein said welded joint is a laser weld, free of auxiliary welding material, said welded joint being located directly connected to said expanded end face, said expanded end face being provided by a thin-walled jacket portion of said capillary tube section.

18. The duct system according to claim 1, wherein said sealed connection is provided between a connecting jacket of said capillary tube section and a bore jacket of said interior of said connecting member, said sealed connection providing a cold welded connection.

19. The duct system according to claim 1, wherein said capillary tube section has a longitudinal axis and bears at least one reference surface extending transverse to said axis, for providing an adjusting reference for positionally adjusting said connecting member with respect to said connecting unit, said connecting member having rear and front end faces, at least one of said end faces providing said reference surface.

20. A process for manufacturing a capillary duct system including at least one capillary tube having at least one enlarged tube end face, at least one connecting unit, and at least one connecting member interconnecting said connecting unit and said tube end, said process including:

forming a first solidified connection from a solidifyable material between said connecting member and said capillary tube enlarged end face; and establishing a second solidified connection on said connecting member so that said first connection is not exposed to the atmosphere surrounding said connecting member.

21. The process according to claim 20, wherein before forming said first connection, said connecting member is put over said enlarged capillary tube end, said connecting member being put over substantially free of radial clearance between an opening in said connecting member and said capillary tube end; said first connection being produced in the vicinity of an end face of said capillary tube end between said end face and said connecting member; whereafter, said connecting member and a base of said connecting unit are interengaged before producing said second solidified connection.

22. The process according to claim 20, wherein prior to forming said first connection, an interlocking positive tension relief is produced for said first connection by widening deformation of said capillary tube.

23. The process according to claim 20, wherein prior to establishing said first connection, said capillary tube end is inserted in a reception bore of said sleeve, whereafter said capillary tube is widened in conjunction with plastifying deformation, whereafter said end portion is axially engaged against a passage portion of said reception bore; and said first connection is produced by annularly intermelting of said end and said passage portion by punctiformly limited melting heating.

24. The process according to claim 23, wherein, prior to insertion in said reception bore, a protective jacket is put on said capillary tube and said capillary tube is coiled, said capillary tube being fixed with its end portions freely exposed in mutual orientations between substantially parallel and equally axial;

after said intermelting, said member is assembled to a body of said connecting unit;

said second connection being produced in radial spacing outside of said capillary tube and contact-free with respect to said capillary tube, all of said connections being produced in program-controlled manner along a production line.

25. The process according to claim 24, wherein prior to establishing said first connection, said capillary tube is at least partially gathered in a coil.

* * * * *